(12) United States Patent
Wei et al.

(10) Patent No.: US 12,276,779 B2
(45) Date of Patent: Apr. 15, 2025

(54) WIDE-ANGLE LENS, CAMERA MODULE AND CAMERA

(71) Applicant: JIANGXI LIANCHUANG ELECTRONIC CO., LTD., Nanchang (CN)

(72) Inventors: Wenzhe Wei, Nanchang (CN); Xuming Liu, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 1042 days.

(21) Appl. No.: 17/023,357

(22) Filed: Sep. 16, 2020

(65) Prior Publication Data

US 2021/0055528 A1 Feb. 25, 2021

Related U.S. Application Data

(63) Continuation-in-part of application No. PCT/CN2020/084192, filed on Apr. 10, 2020.

(30) Foreign Application Priority Data

Aug. 20, 2019 (CN) .................... 2019107668454.4

(51) Int. Cl.
*G02B 13/06* (2006.01)
*G02B 9/64* (2006.01)
(Continued)

(52) U.S. Cl.
CPC .............. *G02B 13/06* (2013.01); *G02B 9/64* (2013.01); *G02B 13/0045* (2013.01); *G02B 27/0025* (2013.01); *H04N 23/55* (2023.01)

(58) Field of Classification Search
CPC ........ G02B 13/06; G02B 13/00; G02B 13/18; G02B 1/00; G02B 9/64; G02B 13/0045;
(Continued)

(56) References Cited

U.S. PATENT DOCUMENTS

2017/0248775 A1* 8/2017 Shih .................... G02B 9/64
2018/0372998 A1* 12/2018 Pao .................. G02B 13/0045

FOREIGN PATENT DOCUMENTS

CN 104007535 A 8/2014
CN 204009204 U 12/2014
(Continued)

OTHER PUBLICATIONS

English translation of CN-107167898-A (Sep. 2017) (Year: 2017).*
(Continued)

*Primary Examiner* — Thomas K Pham
*Assistant Examiner* — Kuei-Jen L Edenfield

(57) ABSTRACT

The disclosure provides a wide-angle lens, a camera module and a camera. The wide-angle lens sequentially includes a first group, a stop, a second group, a third group and a filter. The first group sequentially includes a first lens with a negative refractive power, a second lens with a negative refractive power, and a third lens with a refractive power. The first lens is a meniscus lens. The second lens has a concave image side surface. The second group sequentially includes a fourth lens with a positive refractive power and a fifth lens with a positive refractive power, an image side surface of the fourth lens and an image side surface of the fifth lens are both convex. The third group sequentially includes a cemented doublet and an eighth lens. The eighth lens is a bi-convex lens.

17 Claims, 12 Drawing Sheets

(51) Int. Cl.
*G02B 13/00* (2006.01)
*G02B 27/00* (2006.01)
*H04N 23/55* (2023.01)

(58) Field of Classification Search
CPC .... G02B 27/0025; G02B 7/021; G02B 27/00; G02B 7/02; H04N 23/55
USPC .......................... 359/750, 708, 754, 796, 362
See application file for complete search history.

(56) References Cited

FOREIGN PATENT DOCUMENTS

| CN | 104007535 | B | * | 10/2016 | ............. G02B 13/18 |
|---|---|---|---|---|---|
| CN | 107065137 | A | * | 8/2017 | ......... G02B 13/0045 |
| CN | 107167898 | A | * | 9/2017 | ......... G02B 13/0045 |
| CN | 108241202 | A | | 7/2018 | |
| CN | 108469667 | A | | 8/2018 | |
| CN | 108761745 | A | | 11/2018 | |
| CN | 109143534 | A | | 1/2019 | |
| CN | 110609378 | A | | 12/2019 | |
| JP | 2009128654 | A | | 6/2009 | |
| JP | 2017142363 | A | * | 8/2017 | ............. G02B 13/18 |

OTHER PUBLICATIONS

English translation of CN-104007535-B (Oct. 2016) (Year: 2016).*
English translation of JP-2017142363-A (Aug. 2017) (Year: 2017).*
English translation of CN-107065137 (Year: 2017).*
International search report issued in a corresponding International application No. PCT/CN2020/084192, mailed on Jun. 29, 2020 (8 pages).
Written opinion of the international search authority issued in a corresponding International application No. PCT/CN2020/084192, mailed on Jun. 29, 2020 (6 pages).
SIPO, First Office Action For CN Application No. 201910766845.4, Mar. 9, 2021.

* cited by examiner

WIDE-ANGLE LENS, CAMERA MODULE AND CAMERA

CROSS REFERENCE TO RELATED APPLICATION(S)

This application is a continuation-in-part of PCT Application Serial No. PCT/CN2020/084192, filed on Apr. 10, 2020, entitled "WIDE-ANGLE LENS AND IMAGING DEVICE". The PCT application claims priority to a Chinese application CN 201910766845.4, filed on Aug. 20, 2019, titled "WIDE-ANGLE LENS AND IMAGING DEVICE". The entirety of the above-mentioned applications is hereby incorporated by reference herein.

TECHNICAL FIELD

The present disclosure relates to the field of lens imaging technologies, and more particularly, to a wide-angle lens, an imaging device, a camera module and a camera.

BACKGROUND

With the development of optical lens imaging technologies, wide-angle lenses have also developed rapidly. However, current wide-angle lenses generally have the following shortcomings, such as f-θ distortions are large, peripheral aberrations are difficult to correct due to large light incident angle, the MTF of the peripheral field is sensitive to tolerances, and an assembly yield is low. Based on these, an optical imaging system with small distortion, high resolution and large wide angle is required, and its assembly yield is required to be effectively improved by controlling its structure.

SUMMARY

The objects of the disclosure are to provide a wide-angle lens, an imaging device, a camera module and a camera, having the advantages of small distortion, high resolution, large field of view, and low sensitivity to tolerance.

The embodiments of the disclosure achieve the above objects through the following technical solutions.

In a first aspect, the disclosure provides a wide-angle lens. From an object side to an imaging surface, the wide-angle lens sequentially includes: a first group with a negative refractive power, a stop, a second group with a positive refractive power, a third group with a positive refractive power and a filter. The first group sequentially includes a first lens with a negative refractive power, a second lens with a negative refractive power, and a third lens with a negative refractive power or a positive refractive power. An object side surface of the first lens is convex, an image side surface of the first lens is concave, and an image side surface of the second lens is concave. From the object side to the imaging surface, the second group sequentially includes a fourth lens with a positive refractive power and a fifth lens with a positive refractive power. An image side surface of the fourth lens and an image side surface of the fifth lens are both convex. From the object side to the imaging surface, the third group sequentially includes a sixth lens, a seventh lens, and an eighth lens with a positive refractive power. An object side surface and an image side surface of the eighth lens are both convex. The sixth lens and the seventh lens are cemented to form a cemented doublet. The stop is disposed between the first group and the second group. The filter is disposed between the third group and the imaging surface. The first lens, the second lens, the third lens, the fourth lens, the fifth lens, the sixth lens, the seventh lens and the eighth lens each are glass lenses.

In a second aspect, the disclosure further provides an imaging device. The imaging device includes the wide-angle lens as mentioned in the first aspect and an imaging element, the imaging element is configured for converting optical images formed by the wide-angel lens into electrical signals.

Ina third aspect, the disclosure further provides a camera module. The camera module includes a barrel, a holder, an image sensor and the wide-angle lens as described above. The wide-angle lens is mounted in the barrel, the image sensor is mounted in the holder, and the barrel is movably mounted on the holder. The wide-angle lens is configured to form an optical image. The image sensor is opposite to the wide-angle lens, and is configured to generate image data for the optical image sensed thereby.

In as fourth aspect, the disclosure further provides a camera. The camera includes a memory, a processor, and the camera module as described above. The memory and the camera module are both electrically connected with the processor. The camera module is configured to capture images, the memory is configured to store the captured images, and the processor is configured to process the captured images.

Compared with the related art, the wide-angle lens, the imaging device, the camera module, and the camera provided by the disclosure have the characteristics of small distortion, high resolution, large field of view and low sensitivity to tolerance. The second lens of the first group is mainly used for collecting lights and controlling the distortion. The second group is used for converging the lights. Two lenses are used in the second group to share the refractive power, thereby avoiding the situation that a single lens power is too large and leads to large tolerance sensitivity, so the assembly yield is significantly improved. The cemented doublet, formed by the sixth lens and the seventh lens, are used to eliminate chromatic aberrations.

REFERENCE NUMERALS OF MAIN COMPONENTS

Figure 1:
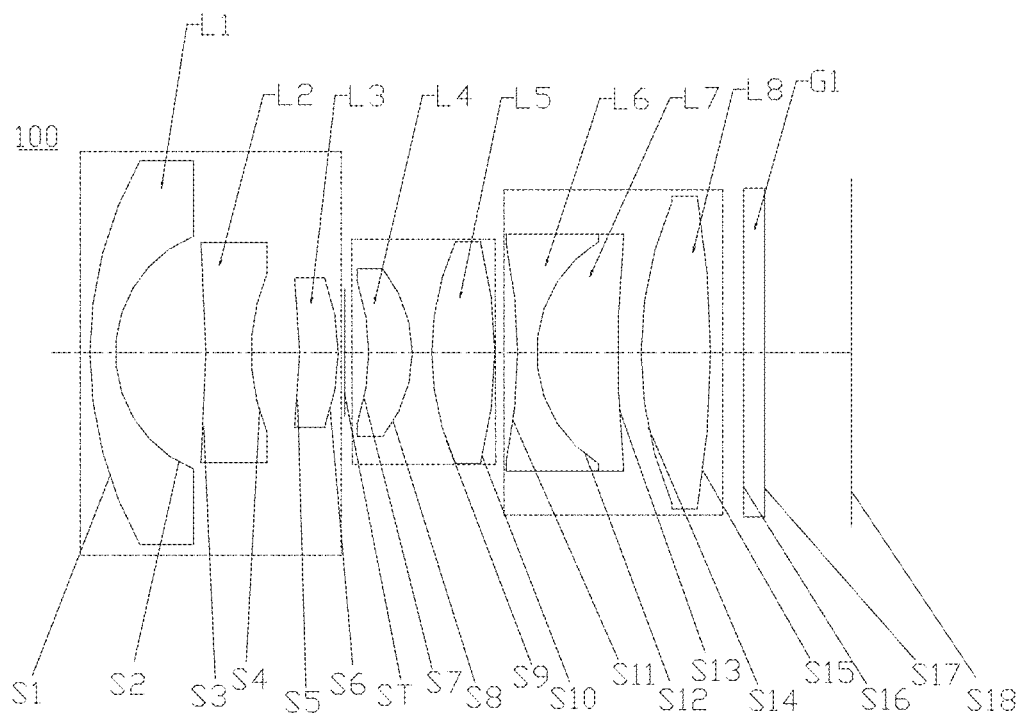
FIG. 1 is a schematic structural diagram of a wide-angle lens in a first embodiment of the disclosure.

| First group | Q1 | Second group | Q2 |
|---|---|---|---|
| Third group | | Q3 | |
| First lens | L1 | Second lens | L2 |
| Third lens | L3 | Fourth lens | L4 |
| Fifth lens | L5 | Sixth lens | L6 |
| Seventh lens | L7 | Eighth lens | L8 |
| Stop | ST | Filter | G1 |
| Object side surface of the first lens | S1 | Image side surface of the first lens | S2 |
| Object side surface of the second lens | S3 | Image side surface of the second lens | S4 |
| Object side surface of the third lens | S5 | Image side surface of the third lens | S6 |
| Object side surface of the fourth lens | S7 | Image side surface of the fourth lens | S8 |
| Object side surface of the fifth lens | S9 | Image side surface of the fifth lens | S10 |
| Object side surface of the sixth lens | S11 | Image side surface of the sixth lens | S12-1 |
| Object side surface of the seventh lens | S12-2 | Image side surface of the seventh lens | S13 |
| Bonding surface of the sixth lens and the seventh lens | S12 | Object side surface of the eighth lens | S14 |
| Image side surface of the eighth lens | S15 | Object side surface of the filter | S16 |
| Image side surface of the filter | S17 | Imaging surface | S18 |
| Imaging device | 500 | Imaging element | 510 |
| Wide-angle lens | | 100, 200, 300, 400 | |
| Camera module | 600 | Barrel | 601 |
| Holder | 602 | Image sensor | 603 |
| Printed circuit board | 604 | Camera | 700 |
| Memory | 701 | Processor | 702 |

The following embodiments will further illustrate the present disclosure with reference to the above drawings.

DETAILED DESCRIPTION OF PREFERRED EMBODIMENTS

In order to better understand the disclosure, the disclosure will be further explained below with reference to the accompanying drawings. The drawings illustrate embodiments of the disclosure, but the disclosure is not limited to these embodiments. Instead, the purpose of providing these embodiments is to make the disclosure more thorough and comprehensive.

The disclosure provides a wide-angle lens. From an object side to an imaging surface, the wide-angle lens sequentially includes a first group with a negative refractive power, a stop, a second group with a positive refractive power, a third group with a positive refractive power, and a filter. From the object side to the imaging surface, the first group sequentially includes a first lens with a negative refractive power, a second lens with a negative refractive power, and a third lens with a negative refractive power or a positive refractive power. An object side surface of the first lens is convex, an image side surface of the first lens is concave, and an image side surface of the second lens is concave. From the object side to the imaging surface, the second group sequentially includes a fourth lens with a positive refractive power and a fifth lens with a positive refractive power. An image side surface of the fourth lens and an image side surface of the fifth lens are both convex. From the object side to the imaging surface, the third group sequentially includes a sixth lens, a seventh lens, and an eighth lens with a positive refractive power. An object side surface and an image side surface of the eighth lens are both convex. The sixth lens and the seventh lens are cemented to form a cemented doublet. The stop is disposed between the first group and the second group. The filter is disposed between the third group and the imaging surface. The first lens, the second lens, the third lens, the fourth lens, the fifth lens, the sixth lens, the seventh lens and the eighth lens each are glass lenses. The wide-angle lens adopts eight glass lenses, thereby to make it have better thermal stability, better mechanical strength, and better imaging effects.

In some embodiments, the wide-angle lens provided by the disclosure meets the expression:

$$-3<(r_8+r_{10})/f_{Q2}<0; \quad (1)$$

where $r_8$ represents a radius of curvature of the image side surface of the fourth lens, $r_{10}$ represents a radius of curvature of the image side surface of the fifth lens, $f_{Q2}$ represents a focal length of the second group.

Satisfying the expression (1), it makes the fourth lens and the fifth lens of the second group can effectively share the refractive power, the situation that the refractive power of a single lens is too large resulting in a large tolerance sensitivity can be avoided, and the assembly yield is obviously improved.

In some embodiments, the wide-angle lens provided by the disclosure meets the expression:

$$0<IH/\theta\leq 0.05; \quad (2)$$

where θ represents a half-FOV (field of view) of the wide-angle lens, IH represents a half actual image height of the wide-angle lens.

Satisfying the expression (2), the magnification of the peripheral field can be improved by controlling the f-θ distortion, the peripheral field may have more pixels, thereby improving the resolution of the peripheral portion of the wide-angle lens, and making the peripheral field has sufficient resolution after flatten a captured image.

In some embodiments, the wide-angle lens provided by the disclosure meets the expression:

$$0 < \varphi_{10}/\varphi_{L5} + \varphi_{11}/\varphi_{L6} < 10; \quad (3)$$

where $\varphi_{10}$ represents a refractive power of an image side surface of the fifth lens, $\varphi_{11}$ represents a refractive power of an object side surface of the sixth lens, $\varphi_{L5}$ represents a refractive power of the fifth lens, $\varphi_{L6}$ represents a refractive power of the sixth lens.

Satisfying the conditional expression (3) can ensure the ability of the fifth lens to converge lights, that is, ensure that the lights are approximately parallel to the optical axis after passing through the fifth lens, so it is convenient for a next correction processing on aberrations such as chromatic aberration, spherical aberration and the like. Meanwhile, it can effectively reduce an incident angle of the lights on the object side surface of the sixth lens, and avoid large aberrations are occurred on the object side surface of the sixth lens.

In some embodiments, the wide-angle lens provided by the disclosure meets the expression:

$$0 < (f_{L1} + f_{L2})/f_{Q1} < 10; \quad (4)$$

where $f_{L1}$ represents a focal length of the first lens, $f_{L2}$ represents a focal length of the second lens, $f_{Q1}$ represents a focal length of the first group.

Satisfying the conditional expression (4) can effectively increase the angle of view, ensure that the angle of view of the wide-angle lens reaches 160° or more, and effectively reduce the angle between the lights and the optical axis, which is beneficial to reduce aberrations at the peripheral filed and reduce the burden of correcting aberrations next.

In some embodiments, the wide-angle lens provided by the disclosure meets the expression:

$$0 < (f_8/f_{L4} + f_{10}/f_{L5})/f_{Q2} < 1; \quad (5)$$

where $f_8$ represents a focal length of the image side surface of the fourth lens, $f_{10}$ represents a focal length of the image side surface of the fifth lens, $f_{L4}$ represents a focal length of the fourth lens, $f_{L5}$ represents a focal length of the fifth lens, and $f_{Q2}$ represents a focal length of the second group.

Satisfying the conditional expression (5) is conducive to increase a relative aperture of the wide-angle lens, thereby improving a transmission of the lens.

In some embodiments, the wide-angle lens provided by the disclosure meets the expression:

$$0 < ENPP/TTL < 0.2; \quad (6)$$

where ENPP represents an entrance pupil position. TTL represent a total optical length of the wide-angle lens.

Satisfying the expression (6) can make the position of the entrance pupil of the wide-angle lens to be closer to the object side, and it is helpful to improve a relative illuminance of the wide-angle lens.

In some embodiments, the wide-angle lens provided by the disclosure meets the expressions:

$$D_1 > D_2 > D_3; \quad (7)$$

$$D_8 > D_7; \quad (8)$$

$$D_5 > D_4; \quad (9)$$

where $D_1$ represents the maximum diameter of the first lens, $D_2$ represents the maximum diameter of the second lens, $D_3$ represents the maximum diameter of the third lens, $D_4$ represents the maximum diameter of the fourth lens, $D_5$ represents the maximum diameter of the fifth lens, $D_6$ represents the maximum diameter of the sixth lens, $D_7$ represents the maximum diameter of the seventh lens, $D_8$ represents the maximum diameter of the eighth lens.

In some embodiments, an object side surface and an image side surface of the sixth lens are both convex, and an object side surface and an image side surface of the seventh lens are both concave. The sixth lens and the seventh lens constitute a cemented doublet. By using such a combination of surface shapes, chromatic aberrations are effectively eliminated while spherical aberrations are reduced.

In some embodiments, the object side surface and the image side surface of the sixth lens are both concave, and the object side surface of the seventh lens is convex.

In some embodiments, an object side surface of the third lens is concave, an image side surface of the third lens is convex, and an object side surface of the second lens is concave.

In some embodiments, an object side surface of the third lens is convex, an image side surface of the third lens is concave, and an object side surface of the second lens is convex.

In some embodiments, both the second lens and the eighth lens are glass aspheric lenses.

By the manner of adopting the glass spherical lenses and glass aspheric lenses, the resolution of the entire wide-angle lens is improved, the distortion and the exit angle of the chief ray are reduced, and the wide-angle lens is ensured to have a large FOV and a good imaging effect. The eighth lens is an aspheric lens, which is configured to control the exit angle of the chief ray and can effectively correct aberrations such as field curvature, spherical aberration and the like. The second lens is a glass aspheric lens, which is mainly used to collect the lights and control the distortion.

The disclosure also provides an imaging device, including the wide-angle lens in any of the above embodiments and an imaging element, wherein the imaging element is configured to convert optical images formed by the wide-angle lens into electrical signals.

The shapes of aspheric surfaces of the wide-angle lens provided by the embodiments of the present disclosure satisfy the following equation:

$$z = \frac{ch^2}{1 + \sqrt{1 - (1+K)c^2h^2}} + Bh^4 + Ch^6 + Dh^8 + Eh^{10} + Fh^{12},$$

where z represents a vector height between a position on the surface and a vertex of the surface along an optical axis of the lens, c represents a curvature of the vertex of the surface, K represents a quadratic surface coefficient, h represents a distance between the position on the surface and the optical axis, B represents a fourth order surface coefficient, C represents a sixth order surface coefficient, D represents an eighth order surface coefficient, E represents a tenth order surface coefficient, F represents a twelfth order surface coefficient.

In each of the following embodiments, the thickness, the radius of curvature and the material of each lens in the wide-angle lens are different. Details can be referred to a parameter table of every embodiment.

First Embodiment

Please refer to FIG. 1, a first embodiment of the disclosure provides a wide-angle lens 100. From an object side to an imaging surface S18, the wide-angle lens 100 sequentially includes a first group Q1, a stop ST, a second group Q2, a third group Q3, and a filter G1.

The first group Q1 has a negative refractive power, and the first group Q1 sequentially includes a first lens L1 having a negative refractive power, a second lens L2 having a negative refractive power, and a third lens L3 having a positive refractive power. An object side surface S1 of the first lens L1 is a convex surface, an image side surface S2 of the first lens L1 is a concave surface, an object side surface S3 of the second lens L2 is a convex surface, an image side surface S4 of the second lens L2 is a convex surface, an object side surface S5 of the third lens L3 is a concave surface, and an image side surface S6 of the third lens L3 is a convex surface.

The second group Q2 has a positive refractive power, and the second group Q2 sequentially includes a fourth lens L4 having a positive refractive power and a fifth lens L5 having a positive refractive power. An object side surface S7 of the fourth lens L4 is a concave surface, an image side surface S8 of the fourth lens L4 is a convex surface, an object side surface S9 and an image side surface S10 of the fifth lens L5 are both convex surfaces.

The third group Q3 has a positive refractive power, and the third group Q3 sequentially includes a sixth lens L6 having a negative refractive power, a seventh lens L7 having a positive refractive power, and an eighth lens L8 having a positive refractive power. The sixth lens L6 and the seventh lens L7 form a cemented body, specifically, an image side surface S12-1 of the sixth lens L6 is adhered to an object side surface S12-2 of the seventh lens L7, that is, the image side surface S12-1 of the sixth lens L6 and the object side surface S12-2 of the seventh lens L7 are seamless bonded to form a bonding surface S12. An object side surface S11 of the sixth lens L6 and an image side surface S12-1 of the sixth lens L6 are both concave surfaces. An object side surface S12-2 of the seventh lens L7 is a convex surface, an image side surface S13 of the seventh lens L7 is a concave surface. An object side surface S14 and an image side surface S15 of the eighth lens L8 are both convex surfaces.

The stop ST is disposed between the first group Q1 and the second group Q2, specifically, the stop ST is disposed between the third lens L3 and the fourth lens L4.

The filter G is disposed between the third group Q3 and the imaging surface 18.

The first lens L1, the second lens L2, the third lens, the fourth lens L4, the fifth lens L5, the sixth lens L6, the seventh lens L7 and the eighth lens L8 of the wide-angle lens 100 provided by the embodiment are made of glass material. The second lens L2, the fifth lens L5 and the eighth lens L8 are glass aspheric lenses.

Relevant parameters of every lens in the wide-angle lens 100 provided by this embodiment are shown in Table 1.

TABLE 1

| Surface No. | Surface type | Radius of curvature (mm) | Thickness (mm) | Refractive index | Abbe number |
|---|---|---|---|---|---|
| | Object surface | Infinity | Infinity | | |
| S1 | Spherical surface | 8.819722 | 0.602392 | 1.901 | 37.05 |
| S2 | Spherical surface | 2.854768 | 2.138819 | | |
| S3 | Aspheric surface | −5.726532 | 1.070475 | 1.693 | 53.20 |
| S4 | Aspheric surface | 363.784943 | 1.146690 | | |
| S5 | Spherical surface | −12.385210 | 0.910028 | 2.001 | 25.44 |
| S6 | Spherical surface | −4.731318 | 0.152955 | | |
| ST | Stop | Infinity | 0.569157 | | |
| S7 | Spherical surface | −5.067608 | 1.030129 | 1.456 | 90.27 |
| S8 | Spherical surface | −3.008328 | 0.458779 | | |
| S9 | Aspheric surface | 7.910199 | 1.489988 | 1.593 | 68.53 |
| S10 | Aspheric surface | −6.313031 | 0.231864 | | |
| S11 | Spherical surface | −11.756423 | 0.449960 | 1.762 | 26.61 |
| S12 | Spherical surface | 2.950239 | 1.924232 | 1.593 | 68.53 |
| S13 | Spherical surface | 26.757152 | 0.684653 | | |
| S14 | Aspheric surface | 8.172556 | 1.639889 | 1.497 | 81.52 |
| S15 | Aspheric surface | −20.000000 | 0.953293 | | |
| S16 | Spherical surface | Infinity | 0.500000 | 1.517 | 64.21 |
| S17 | Spherical surface | Infinity | 2.046704 | | |
| S18 | Imaging surface | Infinity | — | | |

The parameters of the aspheric surfaces of this embodiment are shown in Table 2.

TABLE 2

| Surface No. | K | B | C | D | E | F |
|---|---|---|---|---|---|---|
| S3 | −4.217173 | 1.706092E−02 | −1.780814E−03 | 1.102268E−04 | −3.870196E−06 | 0.000000E+00 |
| S4 | 49.999997 | 2.889048E−02 | 2.977625E−04 | 1.560866E−04 | 3.308395E−05 | 0.000000E+00 |
| S9 | 5.665537 | 6.620032E−05 | 2.293509E−04 | −5.538413E−05 | 9.671675E−06 | −6.115581E−07 |
| S10 | −2.123293 | 1.972482E−03 | 3.127328E−04 | −5.462441E−05 | 1.138465E−05 | −5.986376E−07 |
| S14 | 3.029134 | −7.157074E−04 | 2.398514E−05 | −4.390625E−06 | −5.317827E−07 | 1.658888E−08 |
| S15 | 4.095426 | 7.276872E−04 | 1.101406E−05 | 1.165218E−05 | −1.917691E−06 | 5.258389E−08 |

Figure 2:
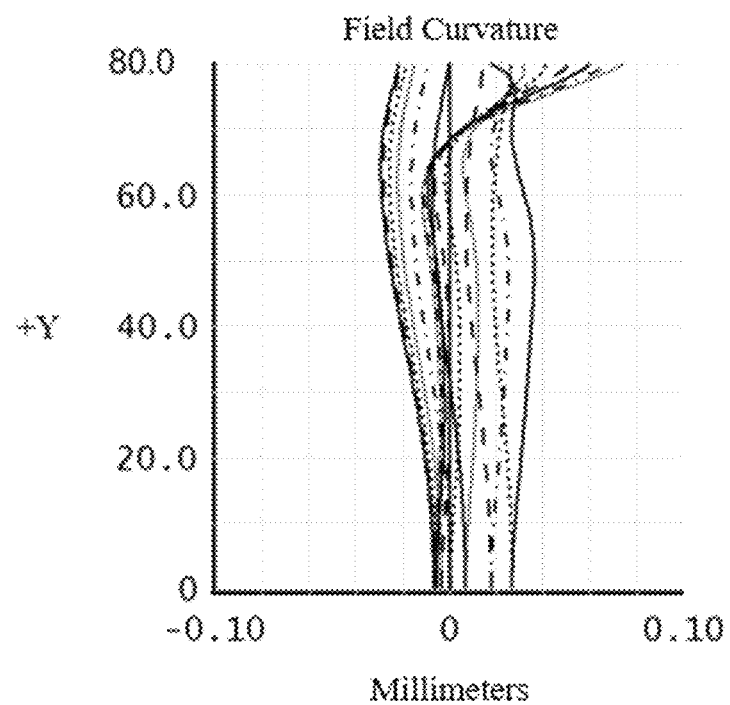
FIG. 2 is a diagram showing field curvature curves of the wide-angle lens in the first embodiment of the disclosure.
Figure 3:
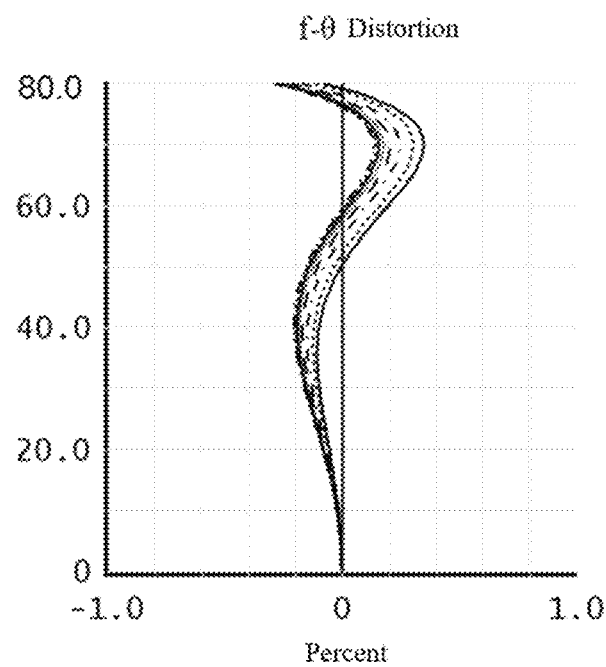
FIG. 3 is a diagram showing distortion curves of the wide-angle lens in the first embodiment of the disclosure.
Figure 4:
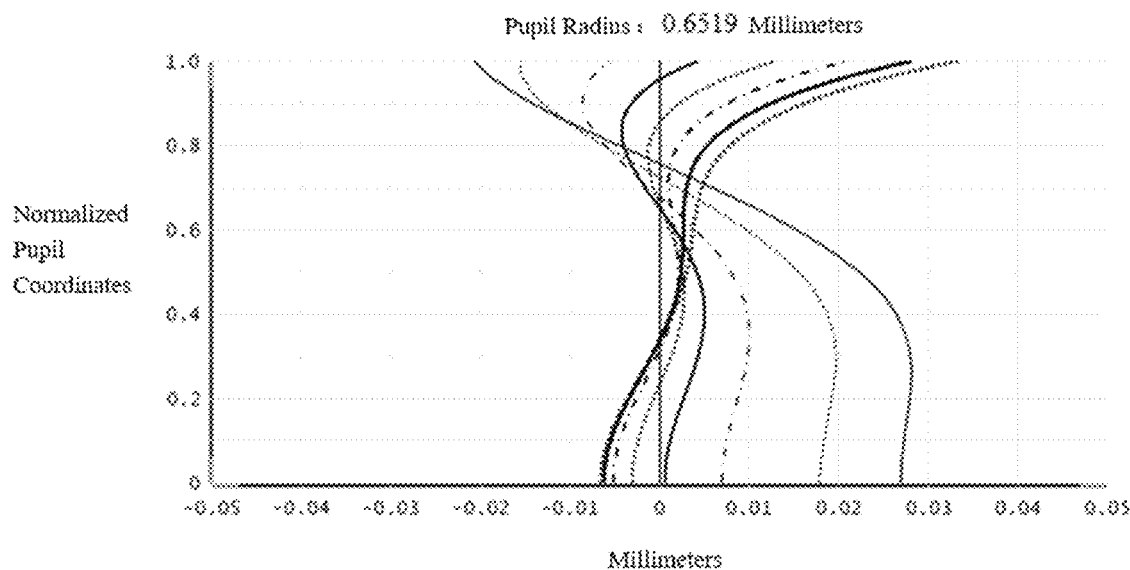
FIG. 4 is diagram showing axial chromatic aberration curves of the wide-angle lens in the first embodiment of the disclosure.
Figure 5:
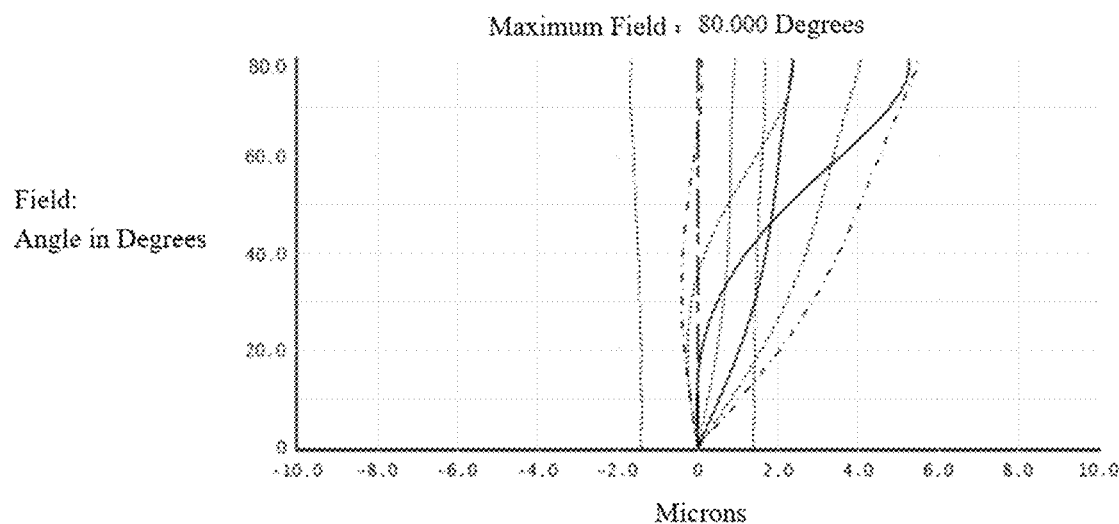
FIG. 5 is a diagram showing lateral chromatic aberration curves of the wide-angle lens in the first embodiment of the disclosure.

In this embodiment, the curves of the field curvature, the distortion, the axial chromatic aberration, and the lateral chromatic aberration are shown in FIG. 2. FIG. 3, FIG. 4, and FIG. 5, respectively. As can be seen from FIG. 2 to FIG. 5, the field curvature, the distortion, the axial chromatic aberration and the lateral chromatic aberration can be well corrected in this embodiment.

Second Embodiment

Figure 6:
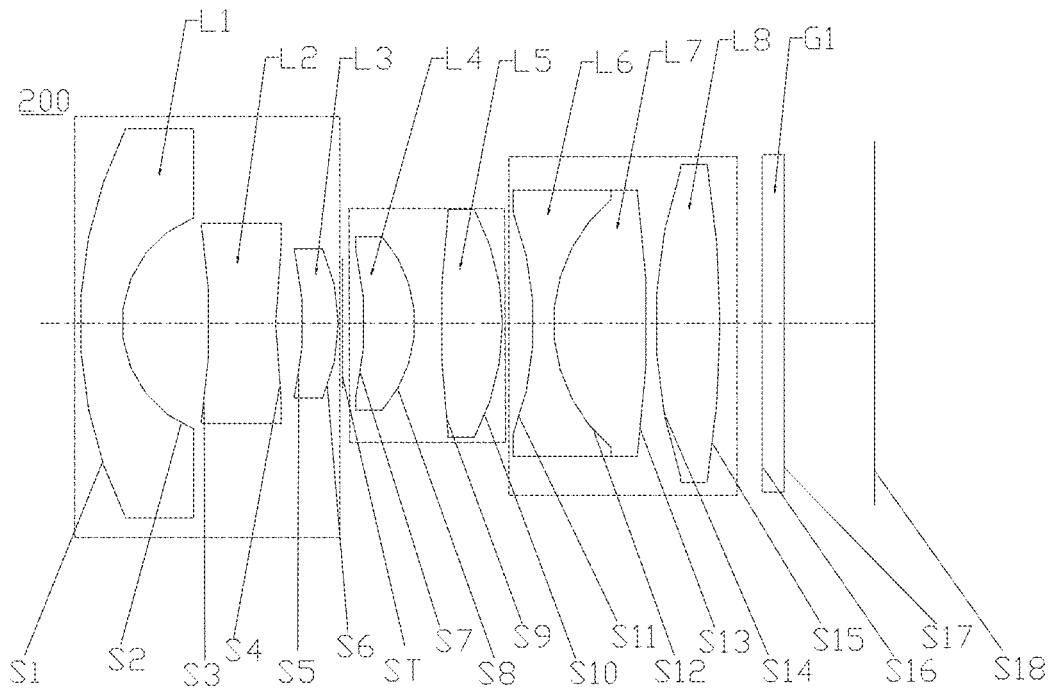
FIG. 6 is a schematic structural diagram of a wide-angle lens in a second embodiment of the disclosure.
Figure 7:
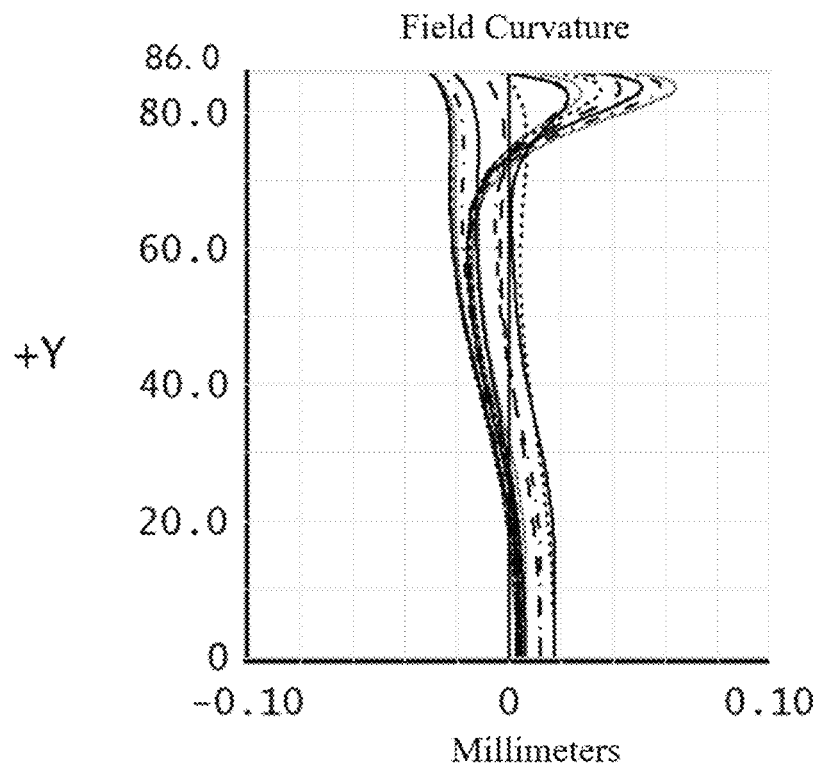
FIG. 7 is a diagram showing field curvature curves of the wide-angle lens in the second embodiment of the disclosure.
Figure 8:
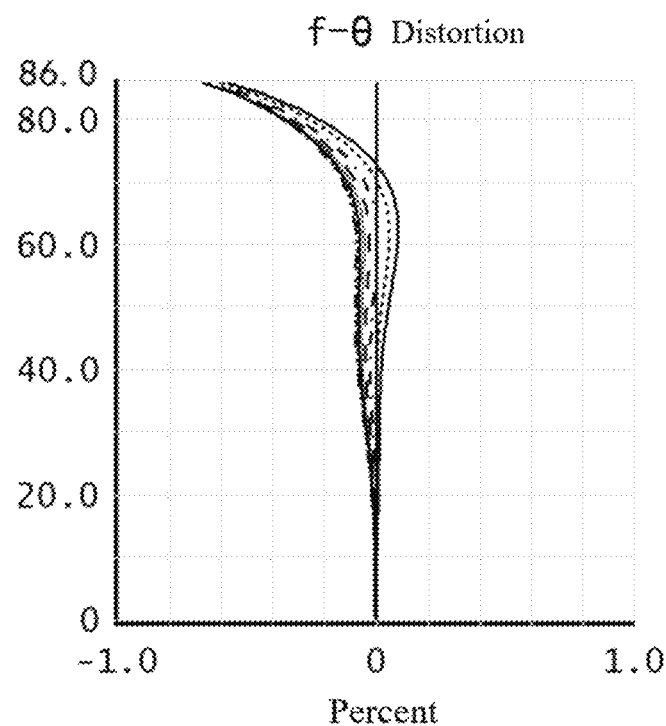
FIG. 8 is a diagram showing distortion curves of the wide-angle lens in the second embodiment of the disclosure.
Figure 9:
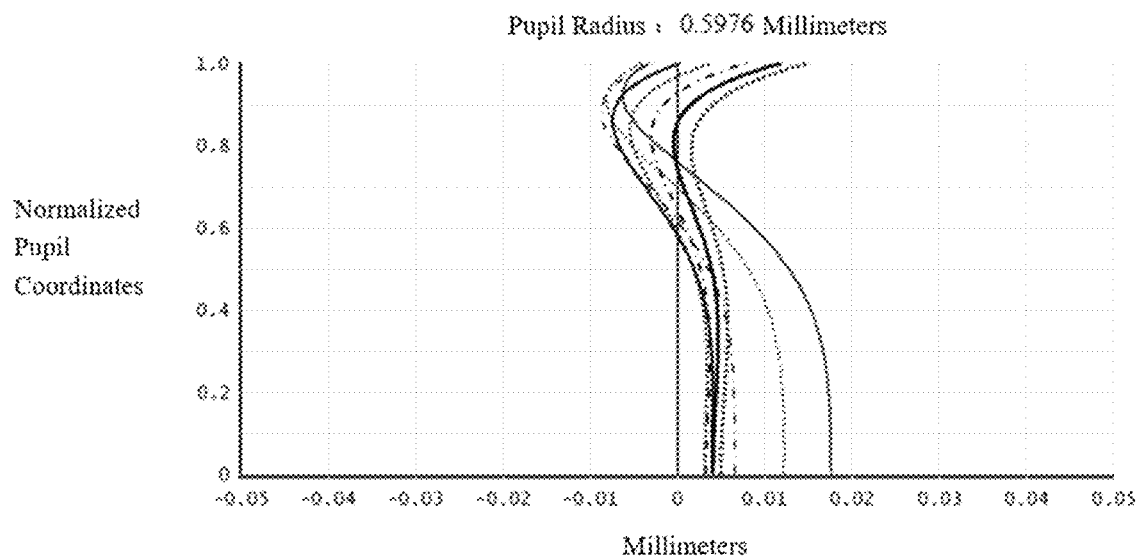
FIG. 9 is diagram showing axial chromatic aberration curves of the wide-angle lens in the second embodiment of the disclosure.
Figure 10:
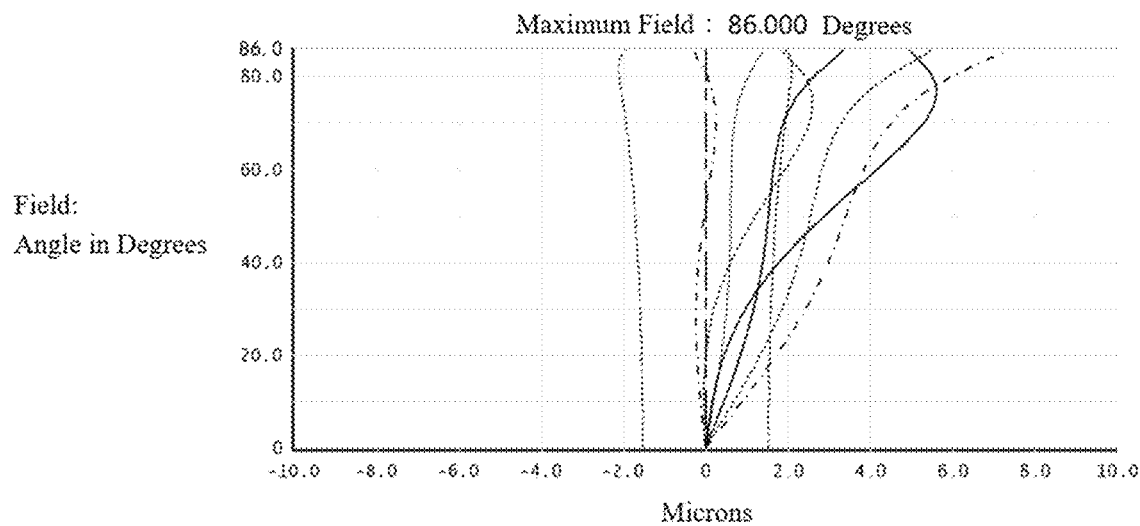
FIG. 10 is a diagram showing lateral chromatic aberration curves of the wide-angle lens in the second embodiment of the disclosure.

FIG. 6 illustrates a structural diagram of a wide-angle lens 200 provided in this embodiment. The wide-angle lens 200 in this embodiment is substantially similar to the wide-angle lens 100 in the first embodiment, expect for the following differences. In the wide-angle lens 200 provided in this embodiment, a paraxial portion of an image side surface S4 of a second lens L2 of a first group Q1 is concave, a fifth lens L5 of a second group Q2 is a glass spherical lens, an image side surface S13 of a seventh lens L7 of a third group Q3 is convex, and the radius of curvature and the materials of every lens are different.

Relevant parameters of every lens of the wide-angle lens 200 of this embodiment are shown in Table 3.

TABLE 3

| Surface No. | Surface type | Radius of curvature (mm) | Thickness (mm) | Refractive index | Abbe number |
|---|---|---|---|---|---|
|  | Object surface | Infinity | Infinity |  |  |
| S1 | Spherical surface | 9.444544 | 0.948576 | 1.901 | 37.05 |
| S2 | Spherical surface | 2.478588 | 1.979128 |  |  |
| S3 | Aspheric surface | −7.276827 | 1.503437 | 1.808 | 40.92 |
| S4 | Aspheric surface | −24.800514 | 0.619772 |  |  |
| S5 | Spherical surface | −6.768660 | 0.799977 | 2.001 | 25.44 |
| S6 | Spherical surface | −3.964910 | 0.097371 |  |  |
| ST | Stop | Infinity | 0.498173 |  |  |
| S7 | Spherical surface | −6.659714 | 1.138742 | 1.456 | 90.27 |
| S8 | Spherical surface | −2.844420 | 0.591979 |  |  |
| S9 | Spherical surface | 18.410316 | 1.394841 | 1.593 | 68.53 |
| S10 | Spherical surface | −5.273844 | 0.706392 |  |  |
| S11 | Spherical surface | −6.653891 | 0.449775 | 1.762 | 26.61 |
| S12 | Spherical surface | 3.522044 | 2.114917 | 1.593 | 68.53 |
| S13 | Spherical surface | −19.868479 | 0.199853 |  |  |
| S14 | Aspheric surface | 8.927626 | 1.457178 | 1.497 | 81.52 |
| S15 | Aspheric surface | −20.000000 | 0.953293 |  |  |
| S16 | Spherical surface | Infinity | 0.500000 | 1.517 | 64.21 |
| S17 | Spherical surface | Infinity | 2.046675 |  |  |
| S18 | Imaging surface | Infinity | — |  |  |

The parameters of the aspheric surfaces of this embodiment are shown in Table 4.

TABLE 4

| Surface No. | K | B | C | D | E | F |
|---|---|---|---|---|---|---|
| S3 | −5.056794 | 6.877634E−03 | −1.489699E−04 | −5.843273E−05 | 4.807285E−06 | 0.000000E+00 |
| S4 | −49.785479 | 1.790657E−02 | 1.159873E−03 | 4.991502E−05 | 3.981873E−05 | 0.000000E+00 |
| S14 | 4.409979 | −9.243431E−04 | −5.623354E−05 | −8.185366E−08 | −6.693897E−07 | 1.425841E−08 |
| S15 | −3.477865 | 1.122641E−03 | −7.097660E−05 | 1.075966E−05 | −1.610196E−06 | 5.136719E−08 |

In this embodiment, the curves of the field curvature, the distortion, the axial chromatic aberration, and the lateral chromatic aberration are shown in FIG. 7, FIG. 8, FIG. 9, and FIG. 10, respectively. As can be seen from FIG. 7 to FIG. 10, the field curvature, the distortion, the axial chromatic aberration and the lateral chromatic aberration can be well corrected in this embodiment.

Third Embodiment

Figure 11:
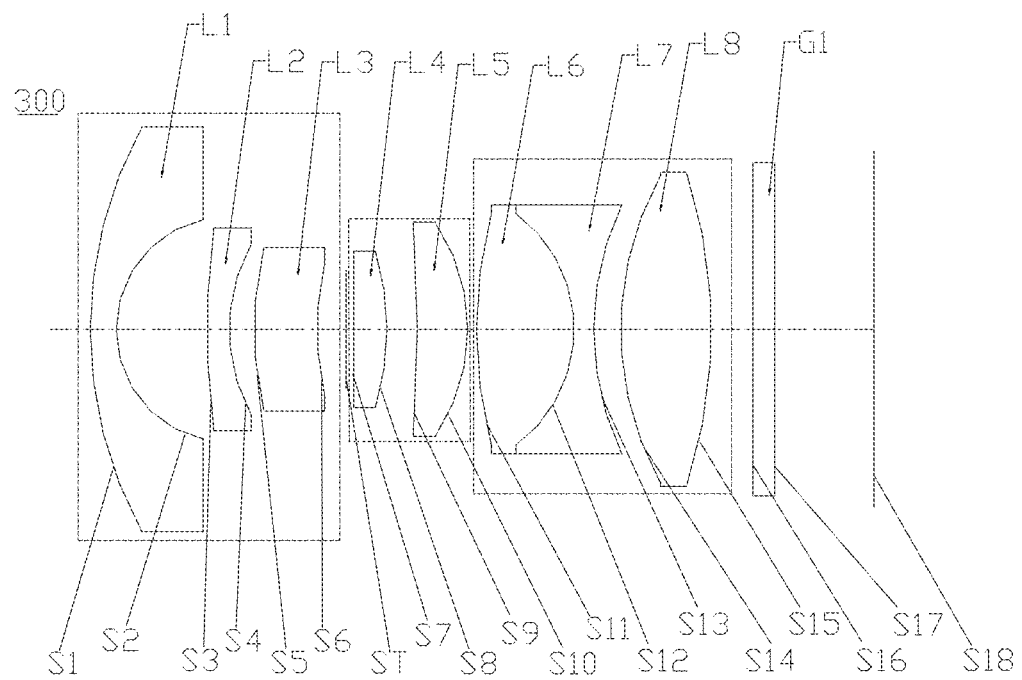
FIG. 11 is a schematic structural diagram of a wide-angle lens in a third embodiment of the disclosure.

FIG. 11 illustrates a structural diagram of a wide-angle lens 300 provided in this embodiment. The wide-angle lens 300 in this embodiment is substantially similar to the wide-angle lens 100 in the first embodiment expect for the following differences. In the wide-angle lens 300 provided by this embodiment, an object side surface S3 of a second lens L2 of a first group Q1 is convex, an object side surface S5 of a third lens L3 is convex, an image side surface S6 of the third lens L3 is concave, and the third lens L3 has a negative refractive power. In the wide-angle lens 300 provided by this embodiment, an object side surface S7 of a fourth lens L4 of a second group Q2 is concave, a fifth lens L5 is a glass spherical lens, and an object side surface S9 of the fifth lens L5 is concave. In the wide-angle lens 300 provided by this embodiment, a sixth lens L6 of a third group Q3 has a positive refractive power, an object side surface S1 and an image side surface S12-1 of the sixth lens L6 are both convex, a seventh lens L7 has a negative refractive power, an object side surface S12-2 and an image side surface S13 of the seventh lens L7 are both concave. Further, the radius of curvature and the materials of every lens in this embodiment are different.

Relevant parameters of every lens of the wide-angle lens 300 of this embodiment are shown in Table 5.

TABLE 5

| Surface No. | Surface type | Radius of curvature (mm) | Thickness (mm) | Refractive index | Abbe number |
|---|---|---|---|---|---|
|  | Object surface | Infinity | Infinity |  |  |
| S1 | Spherical surface | 9.188139 | 0.595676 | 1.743 | 49.24 |
| S2 | Spherical surface | 2.497203 | 2.087965 |  |  |
| S3 | Aspheric surface | 29.912433 | 0.507404 | 1.693 | 53.20 |
| S4 | Aspheric surface | 5.136460 | 0.572831 |  |  |
| S5 | Spherical surface | 7.535142 | 1.443528 | 1.851 | 40.10 |
| S6 | Spherical surface | 6.145891 | 0.668986 |  |  |
| ST | Stop | Infinity | 0.137881 |  |  |

TABLE 5-continued

| Surface No. | Surface type | Radius of curvature (mm) | Thickness (mm) | Refractive index | Abbe number |
|---|---|---|---|---|---|
| S7 | Spherical surface | 31.690277 | 0.799150 | 1.851 | 40.10 |
| S8 | Spherical surface | −5.903793 | 0.698934 |  |  |
| S9 | Spherical surface | −28.701839 | 1.159661 | 1.623 | 56.95 |
| S10 | Spherical surface | −4.181023 | 0.199448 |  |  |
| S11 | Spherical surface | 9.974187 | 2.244214 | 1.618 | 63.41 |
| S12 | Spherical surface | −3.164572 | 0.448927 | 1.740 | 28.29 |
| S13 | Spherical surface | 6.317043 | 0.621246 |  |  |
| S14 | Aspheric surface | 6.651930 | 2.082304 | 1.497 | 81.56 |
| S15 | Aspheric surface | −7.665571 | 0.953293 |  |  |
| S16 | Spherical surface | Infinity | 0.500000 | 1.517 | 64.21 |
| S17 | Spherical surface | Infinity | 2.281574 |  |  |
| S18 | Imaging surface | Infinity | — |  |  |

The parameters of the aspheric surfaces of this embodiment are shown in Table 6.

TABLE 6

| Surface No. | K | B | C | D | E | F |
|---|---|---|---|---|---|---|
| S3 | 0.000000 | 1.049878E−02 | −1.973750E−03 | 1.016378E−04 | −2.980398E−06 | 0.000000E+00 |
| S4 | 0.000000 | 1.633213E−02 | −1.492121E−03 | −1.203000E−04 | 2.163429E−05 | 0.000000E+00 |
| S14 | 0.000000 | −6.703593E−04 | 4.079467E−05 | −9.749596E−07 | 2.555632E−08 | 0.000000E+00 |
| S15 | 0.000000 | 1.554856E−03 | −1.073089E−06 | 3.377720E−06 | −1.218454E−07 | 0.000000E+00 |

Figure 12:
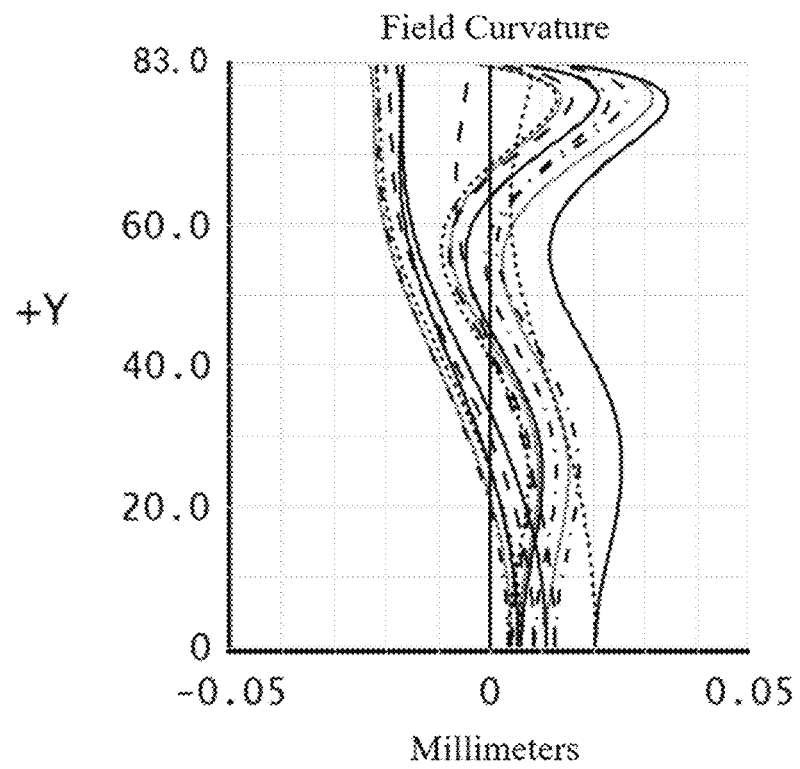
FIG. 12 is a diagram showing field curvature curves of the wide-angle lens in the third embodiment of the disclosure.
Figure 13:
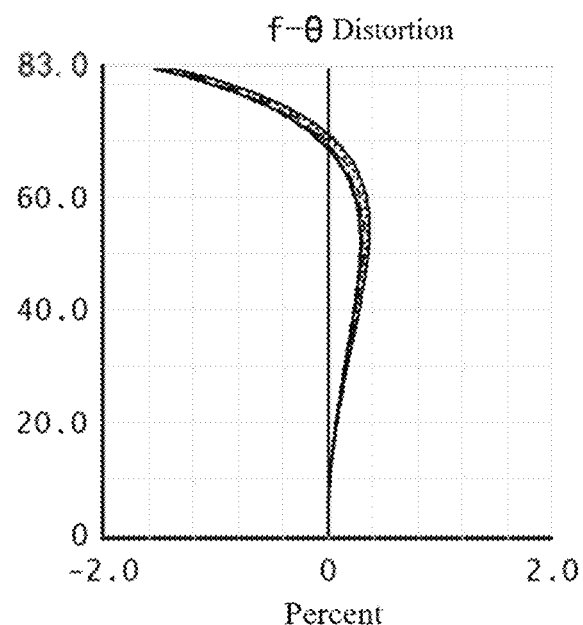
FIG. 13 is a diagram showing distortion curves of the wide-angle lens in the third embodiment of the disclosure.
Figure 14:
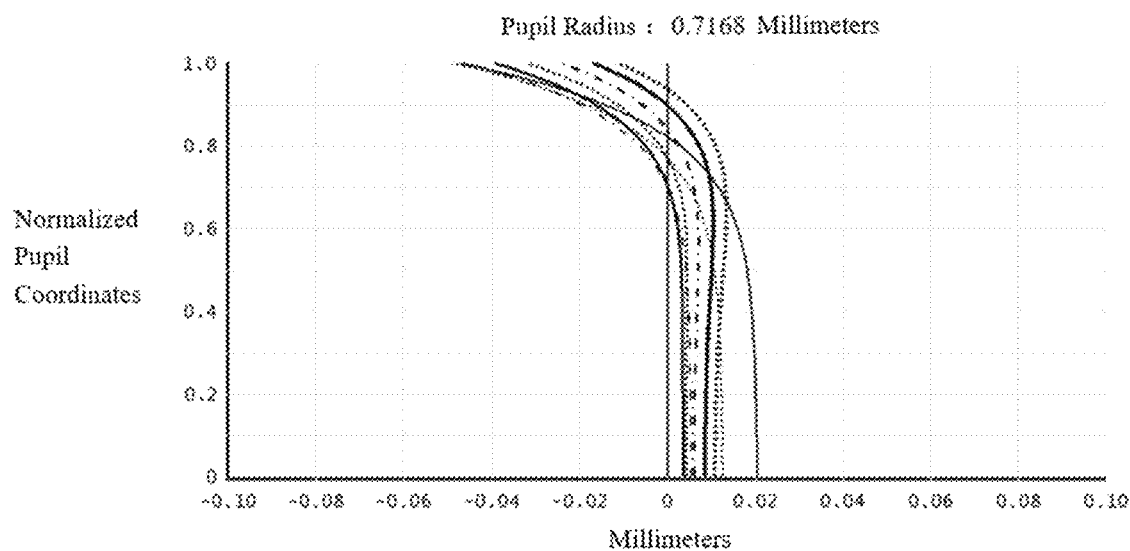
FIG. 14 is a diagram showing axial chromatic aberration curves of the wide-angle lens in the third embodiment of the disclosure.
Figure 15:
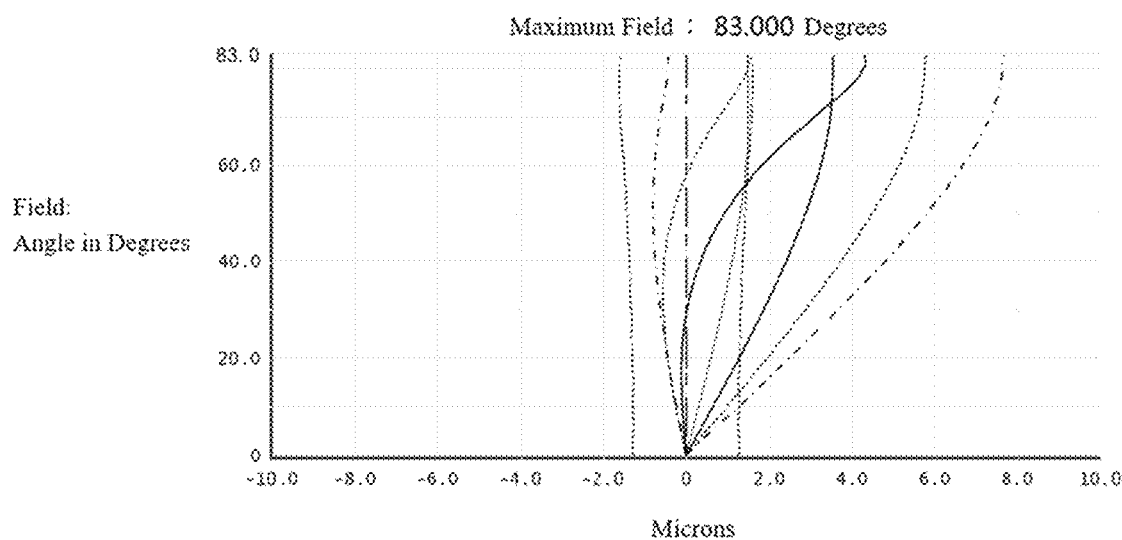
FIG. 15 is a diagram showing lateral chromatic aberration curves of the wide-angle lens in the third embodiment of the disclosure.

In this embodiment, the curves of the field curvature the distortion, the axial chromatic aberration, and the lateral chromatic aberration are shown in FIG. 12, FIG. 13. FIG. 14, and FIG. 15, respectively. As can be seen from FIG. 12 to FIG. 15, the field curvature, the distortion, the axial chromatic aberration and the lateral chromatic aberration can be well corrected in this embodiment.

Fourth Embodiment

Figure 16:
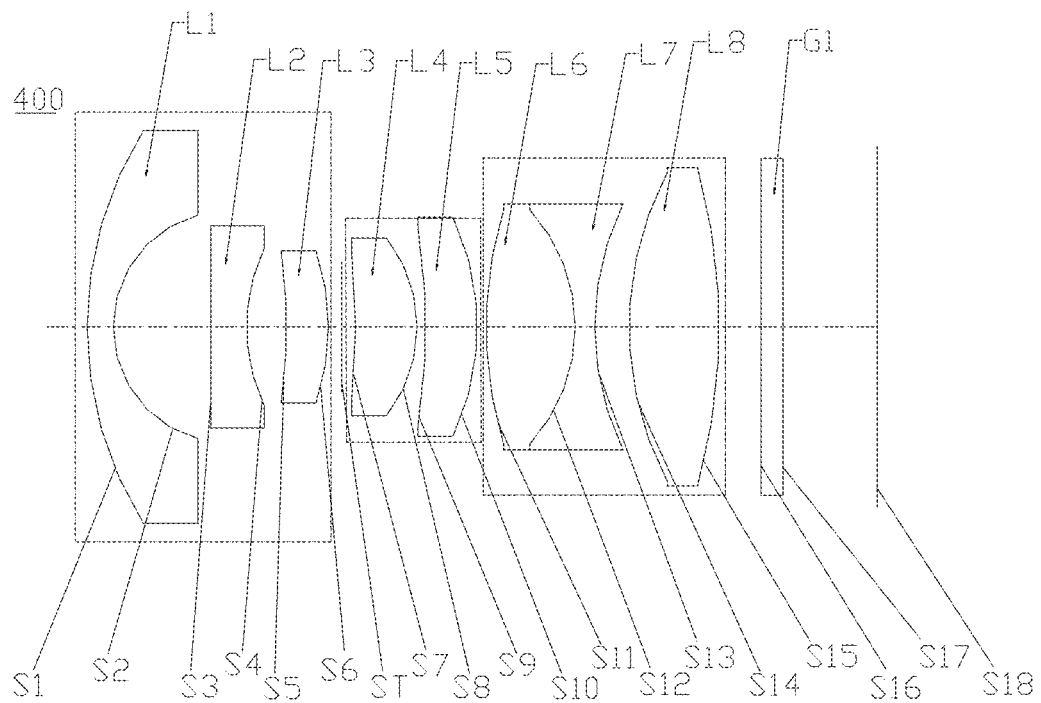
FIG. 16 is a schematic structural diagram of a wide-angle lens in a fourth embodiment of the disclosure.

FIG. 16 a structural diagram of a wide-angle lens 400 provided in this embodiment. The wide-angle lens 400 in this embodiment is substantially similar to the wide-angle lens 100 in the first embodiment expect for the following differences. In the wide-angle lens 400 provided by this embodiment, a fifth lens L5 of a second group Q2 is a glass spherical lens, an object side surface S9 of the fifth lens L5 is concave, a sixth lens L6 of a third group Q3 has positive refractive power, an object side surface S1 and an image side surface S12-1 of the sixth lens L6 are both convex, a seventh lens L7 has a negative refractive power, an object side surface S12-2 and an image side surface S13 of the seventh lens L7 are both concave. In addition the radius of curvature and the materials of every lens in this embodiment are different.

Relevant parameters of every lens of the wide-angle lens 400 of this embodiment are shown in Table 7.

TABLE 7

| Surface No. | Surface type | Radius of curvature (mm) | Thickness (mm) | Refractive index | Abbe number |
|---|---|---|---|---|---|
|  | Object surface | Infinity | Infinity |  |  |
| S1 | Spherical surface | 8.041816 | 0.595727 | 1.835 | 42.74 |
| S2 | Spherical surface | 2.554061 | 2.202841 |  |  |
| S3 | Aspheric surface | −17.710351 | 0.832712 | 1.808 | 40.92 |
| S4 | Aspheric surface | 8.833311 | 0.910073 |  |  |
| S5 | Spherical surface | −11.977171 | 0.957933 | 2.001 | 25.44 |
| S6 | Spherical surface | −5.136445 | 0.303025 |  |  |
| ST | Stop | Infinity | 0.316330 |  |  |
| S7 | Spherical surface | −14.087611 | 1.397873 | 1.456 | 90.27 |
| S8 | Spherical surface | −3.147902 | 0.199455 |  |  |
| S9 | Spherical surface | −13.724095 | 1.176686 | 1.603 | 65.46 |
| S10 | Spherical surface | −5.570678 | 0.197531 |  |  |
| S11 | Spherical surface | 8.680555 | 2.029753 | 1.593 | 68.53 |
| S12 | Spherical surface | −3.774036 | 0.445193 | 1.755 | 27.55 |
| S13 | Spherical surface | 6.107345 | 0.782851 |  |  |
| S14 | Aspheric surface | 6.844186 | 2.052805 | 1.497 | 81.52 |
| S15 | Aspheric surface | −10.087693 | 0.953293 |  |  |
| S16 | Spherical surface | Infinity | 0.500000 | 1.517 | 64.21 |
| S17 | Spherical surface | Infinity | 2.146355 |  |  |
| S18 | Imaging surface | Infinity | — |  |  |

The parameters of the aspheric surfaces of this embodiment are shown in Table 8.

TABLE 8

| Surface No. | K | B | C | D | E | F |
|---|---|---|---|---|---|---|
| S3 | 0.000000 | 1.348151E−02 | −1.986260E−03 | 1.398669E−04 | −4.219425E−06 | 0.000000E+00 |
| S4 | 0.000000 | 2.425673E−02 | −1.420679E−04 | −1.905795E−04 | 8.589930E−05 | 0.000000E+00 |
| S14 | 0.000000 | −5.202873E−04 | 2.354935E−05 | −1.163916E−06 | 2.653061E−08 | 0.000000E+00 |
| S15 | 0.000000 | 9.049079E−04 | 3.488027E−06 | 8.061037E−07 | −7.220623E−08 | 0.000000E+00 |

Figure 17:
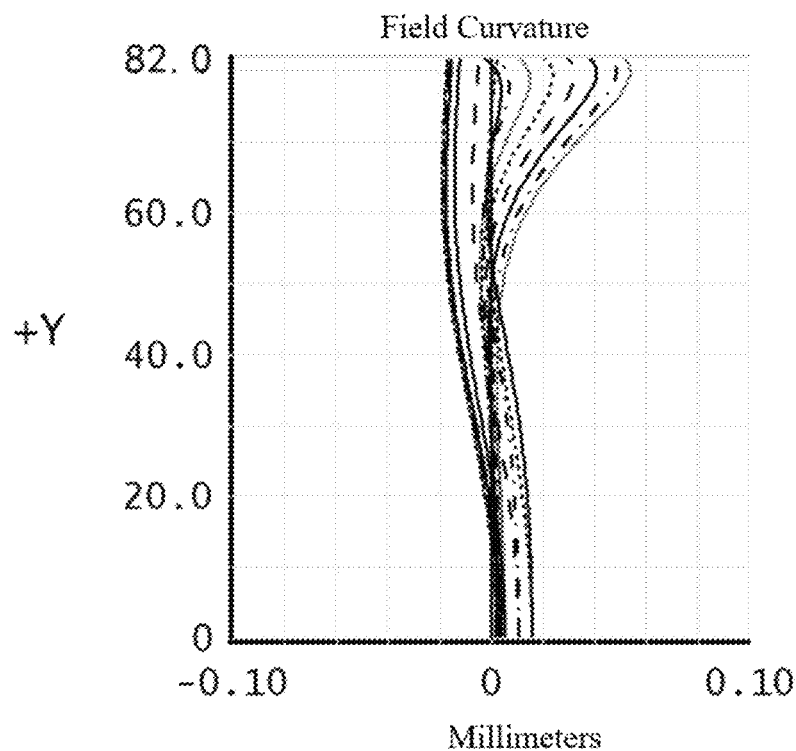
FIG. 17 is a diagram showing field curvature curves of the wide-angle lens in the fourth embodiment of the disclosure.
Figure 18:
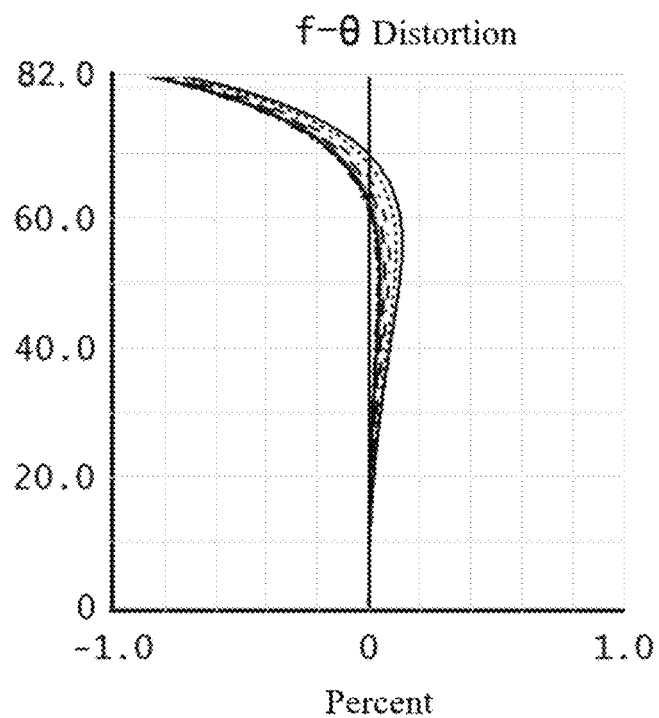
FIG. 18 is a diagram showing distortion curves of the wide-angle lens in the fourth embodiment of the disclosure.
Figure 19:
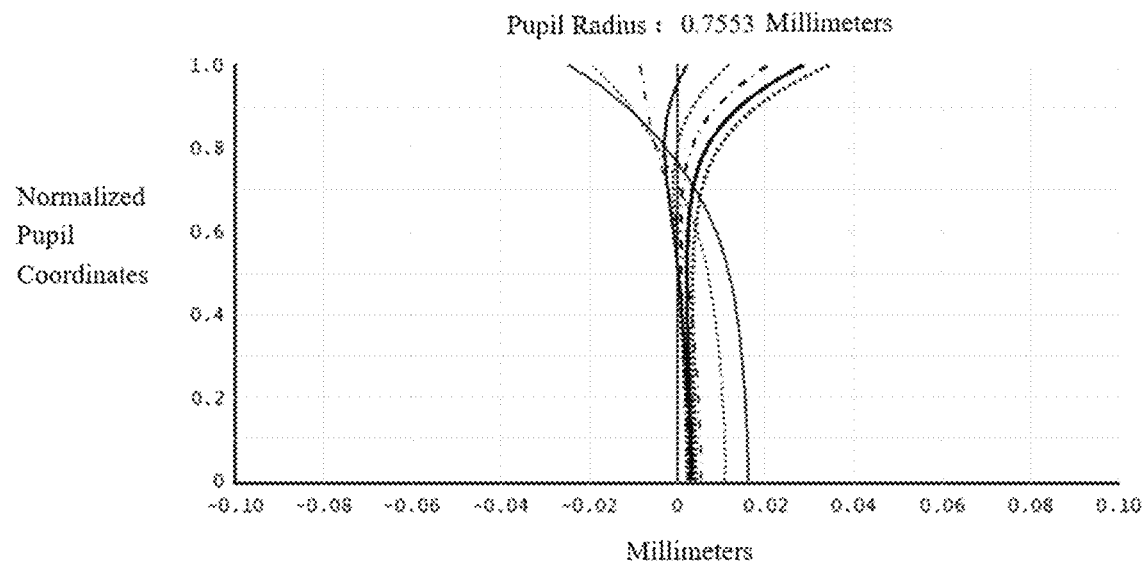
FIG. 19 is a diagram showing axial chromatic aberration curves of the wide-angle lens in the fourth embodiment of the disclosure.
Figure 20:
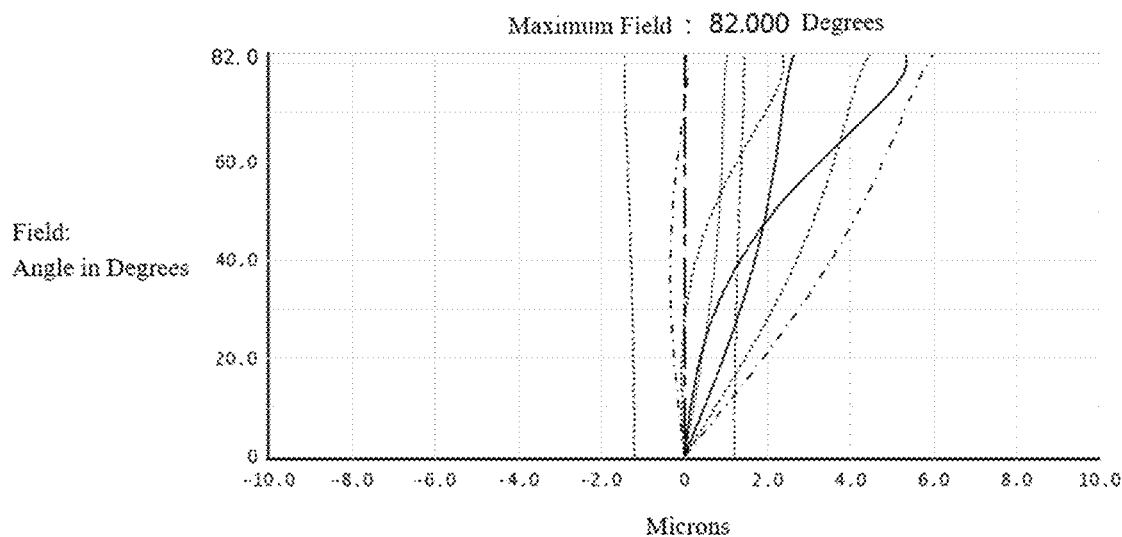
FIG. 20 is a diagram showing lateral chromatic aberration curves of the wide-angle lens in the fourth embodiment of the disclosure.

In this embodiment, the curves of the field curvature the distortion, the axial chromatic aberration, and the lateral chromatic aberration are shown in FIG. 17, FIG. 18. FIG. 19, and FIG. 20, respectively. As can be seen from FIG. 17 to FIG. 20, the field curvature, the distortion, the axial chromatic aberration and the lateral chromatic aberration can be well corrected in this embodiment.

Table 9 shows optical characteristics of the above four embodiments, including the system focal length f, the aperture number F#, the field of view 2θ, the total optical length TTL, and the values corresponding to each of the above expressions.

TABLE 9

| Expression | First embodiment | Second embodiment | Third embodiment | Fourth embodiment |
|---|---|---|---|---|
| f (mm) | 2.868 | 2.869 | 2.867 | 2.761 |
| F# | 2.200 | 2.400 | 2.000 | 1.900 |
| 2θ(deg) | 160.0 | 172.0 | 166.0 | 164.0 |
| TTL (mm) | 18.0 | 18.0 | 18.0 | 18.0 |
| $(r_8 + r_{10})/f_{Q2}$ | −2.178 | −1.887 | −2.684 | −1.543 |
| IH/θ | 0.0500 | 0.0496 | 0.0494 | 0.0497 |
| $\varphi_{10}/\varphi_{L5} + \varphi_{11}/\varphi_{L6}$ | 1.098 | 1.487 | 3.623 | 4.086 |
| $(f_{L1} + f_{L2})/f_{Q1}$ | 4.915 | 6.098 | 5.160 | 5.011 |
| $(f_8/f_{L4} + f_{10}/f_{L5})/f_{Q2}$ | 0.513 | 0.438 | 0.544 | 0.254 |
| ENPP/TTL | 0.146 | 0.141 | 0.149 | 0.144 |

In the above embodiments, the wide-angle lens provided by the disclosure can achieve the following optical indexes: (1) the field of view 2θ≥160°, (2) the optical total length: TTL≤18 mm. (3) the applicable spectral range is 400 nm-700 nm.

In summary, in the wide-angle lens provided by the disclosure, the first lens is a meniscus lens, the second lens is a glass aspherical lens and is configured for collecting the lights and controlling the distortion. The third lens uses the glass material with a high refractive index, thus can correct the axial aberration. The second group is configured for converging the lights. Two lenses are used in the second group to share the refractive power, thereby avoiding the situation that the refractive power of a single lens is too large and leads to large tolerance sensitivity, and effectively improving the assembly yield. The cemented doublet, formed by the sixth lens and the seventh lens of the third group, are configured for eliminating the chromatic aberration. The eighth lens is an aspheric lens, which can effectively correct aberrations such as the field curvature, the spherical aberration, and the like. The eighth lens is also used to control the exit angle of the chief ray.

Fifth Embodiment

Figure 21:
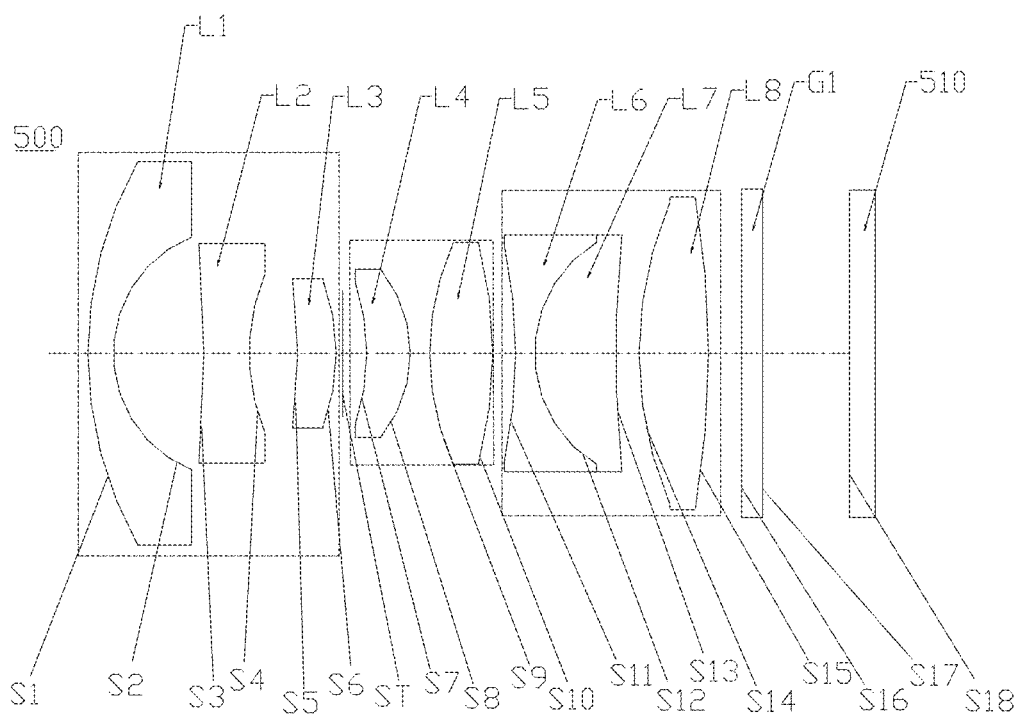
FIG. 21 is a schematic structural diagram of an imaging device in a fifth embodiment of the disclosure.

FIG. 21 illustrates a structural diagram of an imaging device 500 provided by the embodiment. The imaging device 500 includes an imaging element 510 and a wide-angle lens in any of the foregoing embodiments, such as the wide-angle lens 100 of the first embodiment. The imaging element 510 may be a Complementary Metal Oxide Semiconductor (CMOS) image sensor, or a Charge Coupled Device (CCD) image sensor.

The imaging device 500 may be a motion camera, a video camera, a driving recorder, or any other form of an electronic device equipped with the wide-angle lens. The imaging device 500 provided by the disclosure includes the wide-angle lens 100, the wide-angle lens 100 has the advantages of small distortion, high resolution, large field of view, and low tolerance sensitivity, so the imaging device 500 has the corresponding advantages of small distortion, high resolution, large field of view, and low tolerance sensitivity.

Sixth Embodiment

Figure 22:
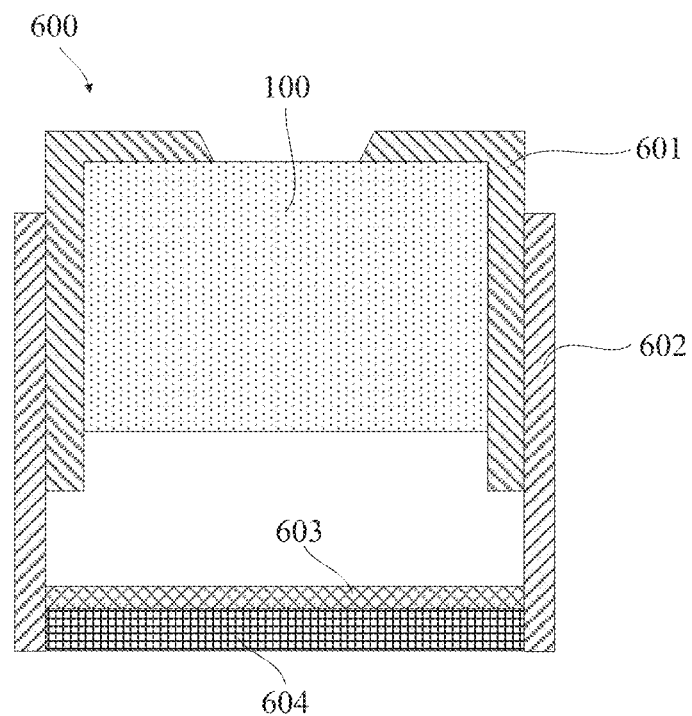
FIG. 22 is a schematic structural diagram showing a cross-section of a camera module according to a sixth embodiment of the disclosure.

FIG. 22 illustrates a structural diagram of a camera module 600. The camera module 600 includes a barrel 601, a holder 602, an image sensor 603, a printed circuit board 604, and the wide-angle lens of any one of the foregoing embodiments. FIG. 22 takes the wide-angle lens 100 of the first embodiment as an example. The wide-angle lens 100 is mounted in the barrel 601, the image sensor 603 is mounted in the holder 602, and the barrel 601 is movably mounted on the holder 602. The wide-angle lens 100 is configured to form an optical image. The image sensor 603 is opposite to the wide-angle lens 100, and is configured to generate image data for the optical image sensed thereby. The image sensor 603 may be a CMOS sensor or a CCD sensor.

It is noted that the image sensor 603 may be mounted on the printed circuit board 604, or may be electrically connected with a processing chip, to process the image data.

Seventh Embodiment

Figure 23:
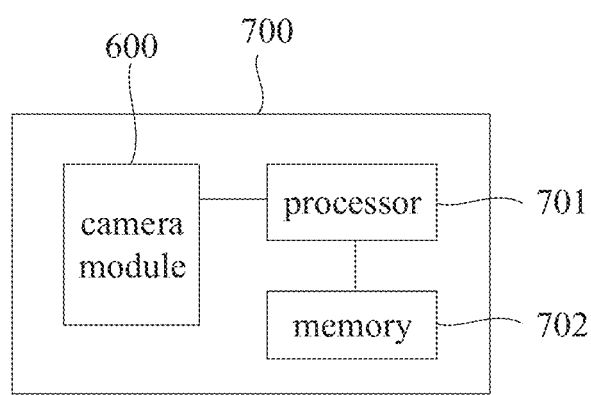
FIG. 23 is a schematic block diagram of a camera according to a seventh embodiment of the disclosure.

FIG. 23 is a block diagram of a camera 700 provided in this embodiment. The camera 700 includes a memory 701, a processor 702, and the camera module 600 as described above. The memory 701 and the camera module 600 are both electrically connected with the processor 702. The camera module 600 is configured to capture images, the processor is configured to acquire and process image data of the captured images, the memory is configured to store the image data of the captured images.

The camera 700 can be used as a motion camera, a video camera, a driving recorder, and the like.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. A wide-angle lens, from an object side to an imaging surface, sequentially comprising:
   a first group with a negative refractive power, the first group comprising a first lens, a second lens and a third lens from the object side to the imaging surface, wherein the first lens has a negative refractive power, a convex object side surface and a concave image side surface, the second lens has a negative refractive power and a concave image side surface, the third lens has a negative refractive power;
   a stop;
   a second group with a positive refractive power, the second group comprising a fourth lens and a fifth lens from the object side to the imaging surface, wherein the fourth lens has a positive refractive power and a convex image side surface, the fifth lens has a positive refractive power and a convex image side surface;
   a third group with a positive refractive power, the third group comprising a sixth lens, a seventh lens, and an eighth lens from the object side to the imaging surface, wherein the sixth lens and the seventh lens are cemented to form a cemented doublet, the eighth lens has a positive refractive power, a convex object side surface and a convex image side surface; and
   a filter, disposed between the third group and the imaging surface;
   wherein the first lens, the second lens, the third lens, the fourth lens, the fifth lens, the sixth lens, the seventh lens and the eighth lens are glass lenses;
   wherein the wide-angle lens meets the expression:

$$0.0494(mm/°) \leq IH/\theta \leq 0.05(mm/°);$$

where $\theta$ represents a half field of view of the wide-angle lens, and IH represents a half actual image height of the wide-angle lens.

2. The wide-angle lens as claimed in claim 1, wherein the wide-angle lens meets the expression:

$$-3 < (r_8 + r_{10})/f_{Q2} < 0;$$

where $r_8$ represents a radius of curvature of the image side surface of the fourth lens, $r_{10}$ represents a radius of curvature of the image side surface of the fifth lens, $f_{Q2}$ represents a focal length of the second group.

3. The wide-angle lens as claimed in claim 1, wherein the wide-angle lens meets the expression:

$$0 < \varphi_{10}/\varphi_{L5} + \varphi_{11}/\varphi_{L6} < 10;$$

where $\varphi_{10}$ represents a refractive power of the image side surface of the fifth lens, $\varphi_{11}$ represents a refractive power of an object side surface of the sixth lens, $\varphi_{L5}$ represents the refractive power of the fifth lens, $\varphi_{L6}$ represents a refractive power of the sixth lens.

4. The wide-angle lens as claimed in claim 1, wherein the wide-angle lens meets the expression:

$$0 < (f_{L1} + f_{L2})/f_{Q1} < 10;$$

where $f_{L1}$ represents a focal length of the first lens, $f_{L2}$ represents a focal length of the second lens, $f_{Q1}$ represents a focal length of the first group.

5. The wide-angle lens as claimed in claim 1, wherein the wide-angle lens meets the expression:

$$0 < (f_8/f_{L4} + f_{10}/f_{L5})/f_{Q2} < 1;$$

where $f_8$ represents a focal length of the image side surface of the fourth lens, $f_{10}$ represents a focal length of the image side surface of the fifth lens, $f_{L4}$ represents a focal length of the fourth lens, $f_{L5}$ represents a focal length of the fifth lens, and $f_{Q2}$ represents a focal length of the second group.

6. The wide-angle lens as claimed in claim 1, wherein an object side surface and an image side surface of the sixth lens are both convex, and an object side surface and an image side surface of the seventh lens are both concave.

7. The wide-angle lens as claimed in claim 1, wherein an object side surface and an image side surface of the sixth lens are both concave, and an object side surface of the seventh lens is convex.

8. The wide-angle lens as claimed in claim 1, wherein an object side surface of the third lens is concave, an image side surface of the third lens is convex, an object side surface of the second lens is concave.

9. The wide-angle lens as claimed in claim 1, wherein an object side surface of the third lens is convex, an image side surface of the third lens is concave, an object side surface of the second lens is convex.

10. The wide-angle lens as claimed in claim 1, wherein the second lens and the eighth lens are both glass aspheric lenses.

11. The wide-angle lens as claimed in claim 1, wherein the wide-angle lens meets the expressions:

$D_1 > D_2 > D_3;$ $D_8 > D_7;$ $D_5 > D_4;$ where $D_1$ represents a maximum diameter of the first lens, $D_2$ represents a maximum diameter of the second lens, $D_3$ represents a maximum diameter of the third lens, $D_4$ represents a maximum diameter of the fourth lens, $D_5$ represents a maximum diameter of the fifth lens, De represents a maximum diameter of the sixth lens, $D_7$ represents a maximum diameter of the seventh lens, $D_8$ represents a maximum diameter of the eighth lens.

12. The wide-angle lens as claimed in claim 1, wherein the wide-angle lens meets the expressions:

$2\theta \geq 160°;$ $TTL \leq 18$ mm;

where TTL represent a total optical length of the wide-angle lens.

13. A camera module, comprising a barrel, a holder, an image sensor, and a wide-angle lens, wherein the wide-angle lens is mounted in the barrel, the image sensor is mounted in the holder, and the barrel is movably mounted on the holder, the wide-angle lens is configured to form an optical image, the image sensor is configured to generate image data for the optical image sensed thereby, wherein the wide-angle lens, from an object side to an imaging surface, sequentially comprises:
a first group with a negative refractive power, the first group comprising a first lens, a second lens and a third lens from the object side to the imaging surface, wherein the first lens has a negative refractive power, a convex object side surface and a concave image side surface, the second lens has a negative refractive power and a concave image side surface, the third lens has a negative refractive power;
a stop;
a second group with a positive refractive power, the second group comprising a fourth lens and a fifth lens from the object side to the imaging surface, wherein the fourth lens has a positive refractive power and a convex image side surface, the fifth lens has a positive refractive power and a convex image side surface;
a third group with a positive refractive power, the third group comprising a sixth lens, a seventh lens, and an eighth lens from the object side to the imaging surface, wherein the sixth lens and the seventh lens are cemented to form a cemented doublet, the eighth lens has a positive refractive power, a convex object side surface and a convex image side surface; and
a filter, disposed between the third group and the imaging surface;
wherein the first lens, the second lens, the third lens, the fourth lens, the fifth lens, the sixth lens, the seventh lens and the eighth lens are glass lenses;
wherein the wide-angle lens meets the expression:

$0.0494(mm/°) \leq IH/\theta \leq 0.05(mm/°);$ where $\theta$ represents a half field of view of the wide-angle lens, and IH represents a half actual image height of the wide-angle lens.

14. The camera module as claimed in claim 13, wherein the wide-angle lens meets the expressions:

$-3 < (r_8 + r_{10})/f_{Q2} < 0;$ $0 < \varphi_{10}/\varphi_{L5} + \varphi_{11}/\varphi_{L6} < 10;$ $0 < (f_{L1} + f_{L2})/f_{Q1} < 10;$ $0 < (f_8/f_{L4} + f_{10}/f_{L5})/f_{Q2} < 1;$ where $r_8$ represents a radius of curvature of the image side surface of the fourth lens, $r_{10}$ represents a radius of curvature of the image side surface of the fifth lens, $f_{Q2}$ represents a focal length of the second group, $P_{10}$ represents a refractive power of the image side surface of the fifth lens, $\varphi_{11}$ represents a refractive power of an object side surface of the sixth lens, $P_{L5}$ represents the refractive power of the fifth lens, $P_{L6}$ represents a refractive power of the sixth lens, $f_{L1}$ represents a focal length of the first lens, $f_{L2}$ represents a focal length of the second lens, $f_{Q1}$ represents a focal length of the first group, $f_8$ represents a focal length of the image side surface of the fourth lens, $f_{10}$ represents a focal length of the image side surface of the fifth lens, $f_{L4}$ represents a focal length of the fourth lens, $f_{L5}$ represents a focal length of the fifth lens.

15. The camera module as claimed in claim 13, wherein the wide-angle lens meets the expressions:

$D_1 > D_2 > D_3;$ $D_8 > D_7;$ $D_5 > D_4;$ where $D_1$ represents a maximum diameter of the first lens, $D_2$ represents a maximum diameter of the second lens, $D_3$ represents a maximum diameter of the third lens, $D_4$ represents a maximum diameter of the fourth lens, $D_5$ represents a maximum diameter of the fifth lens, De represents a maximum diameter of the sixth lens, $D_7$ represents a maximum diameter of the seventh lens, $D_8$ represents a maximum diameter of the eighth lens.

16. A camera, comprising a memory, a processor, and a camera module, the memory and the camera module being electrically connected with the processor, the memory being configured to store image data, the processor being configured to process the image data, the camera module comprising a wide-angle lens and an image sensor, the image sensor being opposite to the wide-angle lens and configured to sense and generate the image data, the wide-angle lens sequentially comprising:
a first group with a negative refractive power, the first group comprising a first lens, a second lens and a third lens from the object side to the imaging surface, wherein the first lens has a negative refractive power, a convex object side surface and a concave image side surface, the second lens has a negative refractive power and a concave image side surface, the third lens has a negative refractive power;
a stop;
a second group with a positive refractive power, the second group comprising a fourth lens and a fifth lens from the object side to the imaging surface, wherein the fourth lens has a positive refractive power and a convex image side surface, the fifth lens has a positive refractive power and a convex image side surface;

a third group with a positive refractive power, the third group comprising a sixth lens, a seventh lens, and an eighth lens from the object side to the imaging surface, wherein the sixth lens and the seventh lens are cemented to form a cemented doublet, the eighth lens has a positive refractive power, a convex object side surface and a convex image side surface; and a filter, disposed between the third group and the imaging surface;

wherein the first lens, the second lens, the third lens, the fourth lens, the fifth lens, the sixth lens, the seventh lens and the eighth lens are glass lenses;

wherein the wide-angle lens meets the expression:

$0.0494(mm/°) < IH/\theta \leq 0.05(mm/°)$;

where $\theta$ represents a half field of view of the wide-angle lens, IH represents a half actual image height of the wide-angle lens.

17. The camera as claimed in claim 16, wherein the wide-angle lens meets the expressions:

$-3 < (r_8 + r_{10})/f_{Q2} < 0$;

$0 < (f_{L1} + f_{L2})/f_{Q1} < 10$;

$0 < (f_8/f_{L4} + f_{10}/f_{L5})/f_{Q2} < 1$;

$D_1 > D_2 > D_3$;

$D_8 > D_7$;

$D_5 > D_4$;

$2\theta \geq 160°$;

$TTL \leq 18$ mm;

where $r_8$ represents a radius of curvature of the image side surface of the fourth lens, $r_{10}$ represents a radius of curvature of the image side surface of the fifth lens, $f_{Q2}$ represents a focal length of the second group, $P_{10}$ represents a refractive power of the image side surface of the fifth lens, $q_{11}$ represents a refractive power of an object side surface of the sixth lens, $P_{L5}$ represents the refractive power of the fifth lens, $P_{L6}$ represents a refractive power of the sixth lens, $f_{L1}$ represents a focal length of the first lens, $f_{L2}$ represents a focal length of the second lens, $f_{Q1}$ represents a focal length of the first group, $f_8$ represents a focal length of the image side surface of the fourth lens, $f_{10}$ represents a focal length of the image side surface of the fifth lens, $f_{L4}$ represents a focal length of the fourth lens, $f_{L5}$ represents a focal length of the fifth lens, $D_1$ represents a maximum diameter of the first lens, $D_2$ represents a maximum diameter of the second lens, $D_3$ represents a maximum diameter of the third lens, $D_4$ represents a maximum diameter of the fourth lens, $D_5$ represents a maximum diameter of the fifth lens, $D_6$ represents a maximum diameter of the sixth lens, $D_7$ represents a maximum diameter of the seventh lens, $D_8$ represents a maximum diameter of the eighth lens, TTL represent a total optical length of the wide-angle lens.

* * * * *